(12) United States Patent
Kwong et al.

(10) Patent No.: US 11,601,704 B2
(45) Date of Patent: Mar. 7, 2023

(54) NOTIFICATION FOR ACCOUNT MANAGEMENT

(71) Applicant: T-Mobile USA, Inc., Bellevue, WA (US)

(72) Inventors: Samson Kim-Sun Kwong, Bellevue, WA (US); Aman Sehgal, Mill Creek, WA (US); Kirby Thornton, Cave Creek, AZ (US); Austin Amort, Dallas, OR (US); Rohit Iyer, Redmond, WA (US); Andrew Cheung, Kirkland, WA (US); Sarvesh Kaushal, Newcastle, WA (US); Reshma Majithia, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/153,778

(22) Filed: Jan. 20, 2021

(65) Prior Publication Data

US 2022/0232277 A1    Jul. 21, 2022

(51) Int. Cl.
*H04N 21/414* (2011.01)
*H04N 21/426* (2011.01)
*H04W 8/24* (2009.01)
*H04W 4/50* (2018.01)
*H04N 21/443* (2011.01)

(52) U.S. Cl.
CPC . *H04N 21/41407* (2013.01); *H04N 21/42684* (2013.01); *H04N 21/4431* (2013.01); *H04W 4/50* (2018.02); *H04W 8/245* (2013.01)

(58) Field of Classification Search
CPC ............... H04L 65/102; H04L 67/2857; H04L 65/1096; H04L 65/1083
USPC .......................................................... 725/62
See application file for complete search history.

(56) References Cited

U.S. PATENT DOCUMENTS

| | | | |
|---|---|---|---|
| 2015/0254726 A1* | 9/2015 | Cassidy ................ | G06Q 50/12 705/14.58 |
| 2018/0332115 A1* | 11/2018 | Mase .................... | H04L 67/125 |
| 2020/0162612 A1* | 5/2020 | Mullane ............ | G06Q 30/0202 |

* cited by examiner

*Primary Examiner* — Jivka A Rabovianski
(74) *Attorney, Agent, or Firm* — Lee & Hayes, P.C.

(57) ABSTRACT

A server operated by a service provider may enable a user to upgrade and/or purchase one or more service plans associated with a user account and provided by the service provider. The service plan may include access to one or more third-party services that provide content accessible via applications. The service provider may inform a notification service that operates a device management platform that the user account is permitted access to the content provider. The notification service may send a message to the user device including an indication that the user device now has access to the content provider and/or a selectable option to install an application associated with the content provider.

20 Claims, 7 Drawing Sheets

NOTIFICATION FOR ACCOUNT MANAGEMENT

BACKGROUND

Telecommunication plans provided by service providers are increasingly becoming more interconnected to network services and content providers. For example, a user may browse the Internet for a telecommunication plan or an upgrade to an existing telecommunication plan. The service provider may have an agreement with one or more third-party content providers to provide services to a user based on a telecommunication plan associated with the user. However, in some instances, the user may lack the knowledge or motivation to download useful content (e.g., an application provided by the content provider) onto a user device following the purchase or upgrade of the telecommunication plan. In some instances, a user may lack the knowledge regarding the procedure for performing the download of the content after purchasing or upgrading the telecommunication plan. In additional instances, a user may simply forget to download such content after purchasing or upgrading of telecommunication plan. In these instances, the user device may provide less than optimal performance for the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to techniques for configuring a user device to access content of a content provider after a purchase or activation of a service plan from a service provider. The service provider may operate a telecommunication network and provide a network portal from which services (e.g., telecommunication plans) may be purchased, upgraded, or otherwise acquired. The user device may be any electronic device that depends on a communication network, such as a telecommunication network or the Internet, to perform one or more functions. The content may be provided by multiple content providers. The content providers may include third-party content providers and/or the service provider. A content provider may be a service that provides streaming or downloadable content to the user device. The content may include any type of content available for download or streaming such as streaming media content, downloadable media content, applications, software updates, software patches, device configuration settings, and so forth.

In various embodiments, a user may login to the network portal provided by the service provider using identifiable information, such as a username or phone number associated with a user device of the user and/or a user account associated with the user. As a user selects a service plan for purchase and/or upgrade from the network portal of the service provider, a network page of the portal may provide the user with a number of different service plans that include access to a number of different content providers. In turn, if the user decides to sign up for a new service or upgrade an existing service for use with the user device, the service provider may send a transmission to a notification service indicating that the user now has access to said content providers. The notification service may operate as a platform that communicates with a management application that was pre-loaded on the user device prior to a purchase of the device. The management application may provide the notification service with remote management of the user device and may cause the user device to perform certain actions, such as, but not limited to, pushing messages, pushing notifications, deleting other applications, adding other applications, activating/deactivating Wi-Fi, updating other applications, etc.

In some cases, once the notification service has received the indication that a user account associated with the user now has access to the content provider, the notification service may access a database to determine if the user device associated with the user has the management application installed. For example, the notification service may receive a transmission from the service provider via an application programming interface (API) call established between the service provider and the notification service. The transmission may include the identifiable information of the user account (e.g., username, telephone number, etc.) and may include an indication that the user account now has access to the content provider. The database may contain records of each device that has the management application installed. The notification service may use the identifiable information provided in the transmission to search the database and determine if the user device has downloaded the management application. In some cases, these devices may be listed by Mobile Station International Subscriber Directory Number (MSISDN) and/or by Billing Account Number (BAN).

In various embodiments, if the notification service determines that the user device associated with the user does have the management application installed, the notification service may send a message, such as a push notification, to the user device via the management application. The message may include an indication to the user that the new service plan and/or the upgraded service plan includes access to a content provider. In some cases, the message may indicate that an application associated with the content provider has been automatically downloaded onto the user device. In other cases, the message may provide a selectable option for the user to download the application onto the user device. In response to the user selecting to download the application, the user device may automatically download the application to the user device.

In some cases, once the user device is instructed to download the application associated with the content provider, the user device may access an application depository or repository that may provide the user device with the requested application. For example, the service provider may maintain the application repository that stores applications associated with various content providers. Once the service provider has determined that the user account associated with the user may have access to a particular content provider (e.g., via the application) and the user device has requested to download the application from the application repository, the service provider may then provide the application to the user device. In other cases, once the user device is instructed to download the application associated with the content provider, the user device may access a third-party resource, such as an application store, to download the application.

In this way, the notification service enables the user access to the content provider without the user having to self-discover the application themselves or having to provide login information to the content provider, which may dissuade the user from accessing the content provider. The content provider may be considered any service that provides content, such as, but not limited to, a movie streaming service, a television streaming service, a music streaming service, an electronic book service, and/or an audio book service.

An illustrative environment and illustrative techniques for configuring a user device with access to a content provider are described below. However, the described techniques may be implemented in other environments.

Illustrative System Architecture

Figure 1:
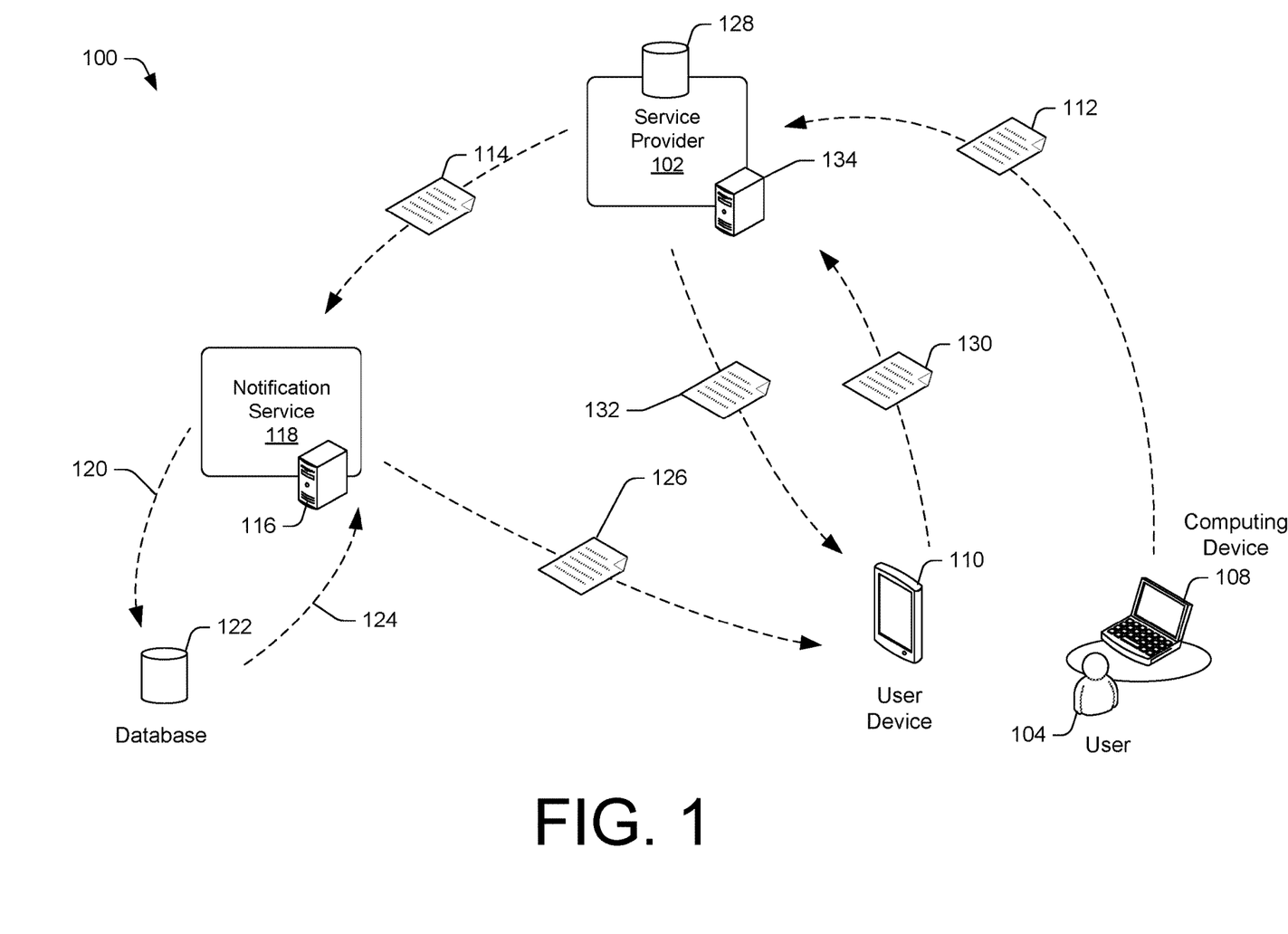
FIG. 1 is a schematic diagram of an illustrative computing environment for configuring a user device with access to a content provider.

FIG. 1 is a schematic diagram of an illustrative computing environment 100 for configuring a user device with access to a content provider. The computing environment 100 may include a service provider 102. The service provider 102 may operate a network portal from which service plans may be purchased, upgraded or otherwise acquired by users, such as the user 104. The network portal may be hosted on one or more servers 134 of the service provider 102. The user 104 may use a computing device 108 to access the network portal of the service provider 102 and make purchases. In various embodiments, the user 104 may login to the network portal provided by the service provider 102 using identifiable information, such as a username or phone number associated with a user device 110 of the user 104. As the user 104 selects a service plan for purchase and/or upgrade from the network portal of the service provider 102, a network page of the portal may provide the user 104 with a number of different service plans that include access to a number of different content providers. In turn, if the user 104 decides to sign up for a new service or upgrade an existing service for use with the user device 110 by making a selection 112, the service provider 102 may send a transmission 114 to a notification server 116 of a notification service 118 indicating that the user now has access to said content providers.

The notification service 118 may operate as a platform that communicates with a management application stored on the user device 110. The management application may provide the notification service 118 with remote management of the user device 110 and may cause the user device 110 to perform certain actions, such as, but not limited to, pushing messages, pushing notifications, deleting other applications, adding other applications, activating/deactivating Wi-Fi, updating other applications, etc.

In some cases, once the notification service 118 has received the transmission 114 indicating that a user account associated with the user 104 now has access to the content provider, the notification service 118 may send a transmission 120 to a database 122 to determine if the user device 110 associated with the user 104 has the management application installed. For example, the notification service 118 may receive the transmission 114 from the service provider 102 via an application programming interface (API) established between the service provider 102 and the notification service 118. The transmission 114 may include the identifiable information of the user account (e.g., username, telephone number, etc.) and may include an indication that the user account now has access to the content provider. In some cases, the transmission 114 may also include an indication that an application exists that is associated with the content provider and may be usable by the user device 110 to access content provided by the content provider.

The database 122 may contain records of each device that has the management application installed. The notification service 118 may use the identifiable information provided in the transmission 114 to search the database 122 and determine if the user device 110 has downloaded the management application. The database 122 may return a transmission 124 indicating to the notification service 118 that the user device 110 has previously downloaded the management application. In some cases, device information stored in the database 122 may be listed by Mobile Station International Subscriber Directory Number (MSISDN) and/or by Billing Account Number (BAN). Each device listed in the database 122 may include an indication whether or not the device has stored the management application.

In various embodiments, if the notification service 118 determines that the user device 110 associated with the user 104 does have the management application installed, the notification service 118 may send a message 126, such as a push notification, to the user device 110 via the management application. The message 126 may include an indication to the user 104 that the new service plan and/or the upgraded service plan includes access to a content provider. In some cases, the message 126 may indicate that an application associated with the content provider has been automatically downloaded onto the user device 110. In other cases, the message 126 may provide a selectable option for the user 104 to download the application onto the user device 110. In response to the user 104 selecting to download the application, the user device 110 may automatically download the application to the user device 110.

In some cases, once the user device 110 is instructed to download the application associated with the content provider (e.g., via instruction from the user 104 or via instruction from the notification service 118), the user device 110 may access an application repository 128 that may provide the user device 110 with the requested application. For example, the service provider 102 may maintain the application repository 128 that stores applications associated with various content providers. Once the service provider 102 has determined that the user account associated with the user 104 may have access to a particular content provider (e.g., via the application) and the user device 110 has sent a message 130 requesting to download the application from the application repository 128, the service provider 102 may then send a message 132, including the application and/or a credential to access the application, to the user device 110. In other cases, once the user device 110 is instructed to download the application associated with the content provider, the user device 110 may access a third-party resource, such as an application store, to download the application.

In some cases, the service provider 102, the computing device 108, the notification service 118, and the user device 110 of the computing environment 100 may communicate via a network. The network may be a local area network ("LAN"), a larger network such as a wide area network ("WAN"), a mobile telephone network, a cable network, a satellite network, and/or a collection of networks, such as the Internet. The network may be a wired network, a wireless network, or both. In various embodiments, the service provider 102 and the notification service 118 may communicate via various protocols. The protocols may include the common gateway interface (CGI) protocol, the active server pages (ASP) protocol, asynchronous JavaScript and XML (AJAX), hypertext transfer protocol secure (HTTPS) protocol, an application programming interface (API) and/or the like.

In various embodiments, the content service may be a service that provides streaming or downloadable content to the user device. The content may include streaming or downloadable media content, downloadable applications, software updates, software patches, device configuration settings, and so forth. The content providers may provide the content in exchange for one-time fees, recurring subscription fees, advertising agreements, other monetary or non-monetary receivables, or for free.

Example Components

Figure 2:
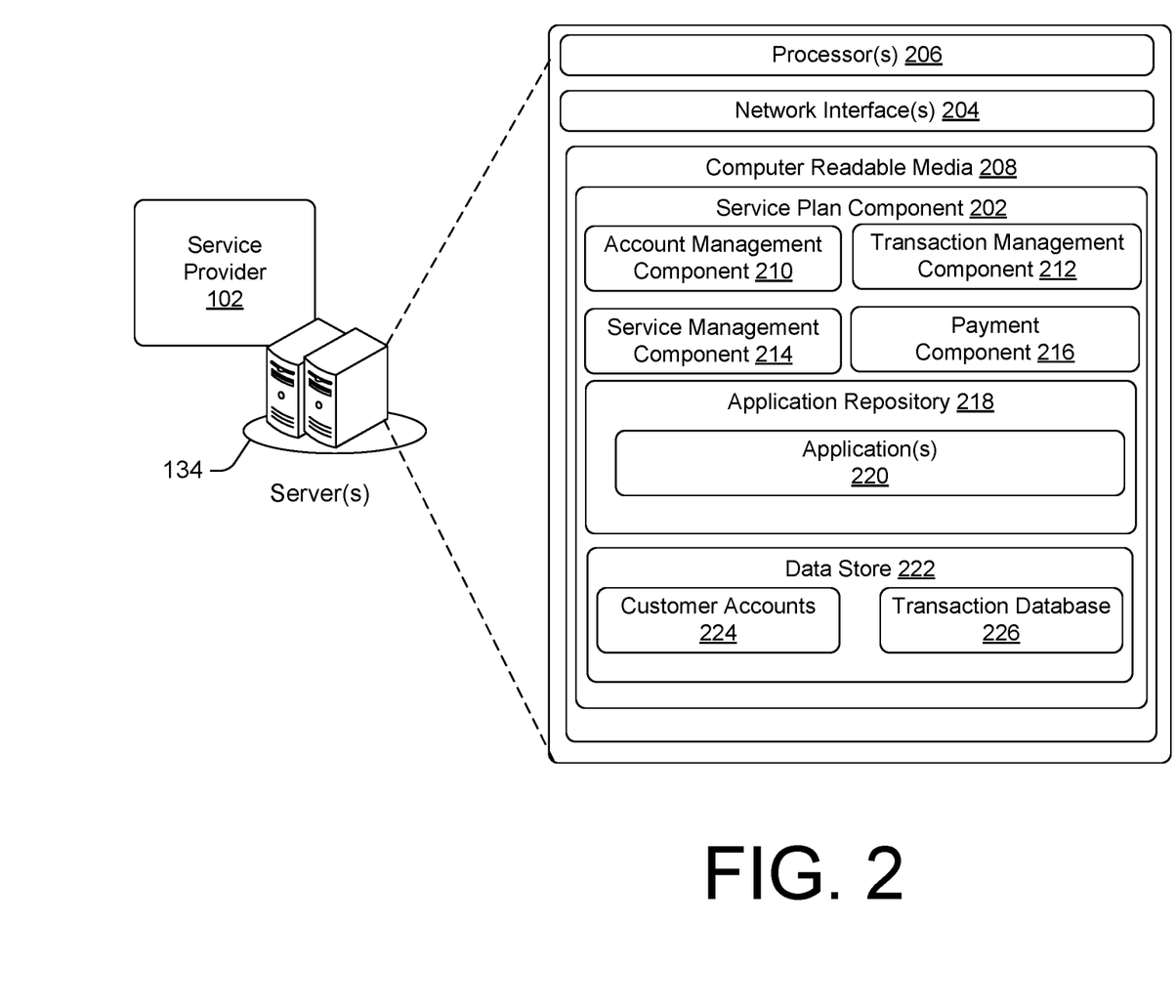
FIG. 2 is a schematic diagram of illustrative components in an example server of a service provider that configures a user device with access to a content provider.

FIG. 2 is a schematic diagram of illustrative components in an example server 134 that configures a user device with access to a content provider. A service plan component 202 may be implemented by the one or more servers 134. In some cases, the servers 134 may be associated with the service provider 102. The servers 134 may be equipped with network interfaces 204, processor(s) 206, and non-transitory computer readable media 208. The network interfaces 204 may include wireless and/or wireless communication interface components that enable the servers 134 to transmit and receive data via a network. In various embodiments, the wireless interface component may include, but is not limited to, cellular, Wi-Fi, Ultra-wideband (UWB), Bluetooth, satellite transmissions, and so forth. The wired interface component may include a direct input/output (I/O) interface, such as an Ethernet interface, a serial interface, a Universal Serial Bus (USB) interface, and/or so forth.

The computer readable media 208 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions.

The service plan 202 may include an account management component 210, a transaction management component 212, a service management component 214, a payment component 216, an application repository 218, and a number of applications 220. The service plan 202 may further include a data store 222. Accordingly, each component of the service plan 202 is discussed herein in turn.

The account management component 210 may enable users, such as the user 104, to create customer accounts 224 (e.g., user accounts). The user 104 may establish a corresponding customer account by providing registration information to the account management component 210 via an electronic device, such as the computing device 108. The registration information may include a customer name, a customer address, customer contact information, a login name, a password, and so forth. Each of the customer accounts 224 may also include account access information for one or more financial accounts that a corresponding customer provided for paying purchase transactions. In various embodiments, the account management component 210 may provide authentication functions that control access to the customer accounts 224.

The transaction management component 212 may handle the processing of transactions for the acquisition of service plans from the network portal of the service provider 102. Each of the transactions may include transaction details, such as a purchase order number, a name of each item purchased, a description of each item, a cost of each item, a number of each item purchased, a purchase total, and so forth. The transaction management component 212 may store the transaction details for each purchased product or service in the transaction database 226. The transaction management component 212 may obtain payment for the purchase of a product from a financial account of a user, such as the user 104. A financial account may be a checking account, a savings account, a debit card account, a credit card account, a stored value card account, a charge card account, a gift card account, and/or the like. In some instances, a user may also have arranged to have funds directly deposited in a corresponding customer account, such as one of customer accounts 224. Thus, in such instances, the transaction management component 212 may alternatively or concurrently arrange for the funding of a purchase transaction using funds stored in a customer account of a user.

The service management component 214 may arrange for the display of a service plan selection page, prior to the transaction management component 212 completing a purchase transaction. In various embodiments, the service plan selection page may be displayed for a number of service plans being purchased and/or upgraded when the user 104 is accessing the network portal of the service provider 102.

In some cases, the service provider 102 may provide a user with the option to use an existing customer account that the user established with the service provider 102 to provide payments associated with the selected service plan and/or the content provider. Once set up, the payment component 216 may use the funds and/or payment information (e.g., credit card number) in the customer account to make payments associated with the selected service plan and/or the content provider.

The application repository 218 may store a number of applications 220 that are configured to provide access to content providers. For example, once the user device 110 is instructed to download the application 220 associated with the content provider (e.g., via instruction from the user 104 or via instruction from the notification service 118), the user device 110 may access the application repository 218 (which may be the same or similar to application repository 128) and which may provide the user device 110 with the requested application 220. For example, the server 134 may maintain the application repository 218 that stores applications 220 associated with various content providers. Once the service provider 102 has determined that the user account associated with the user 104 may have access to a particular content provider (e.g., via the application 220) and the user device 110 has sent a message 130 requesting to download the application 220 from the application repository 218, the service provider 102 may then send a message 132, including the application 220 and/or a credential to access the application 220, to the user device 110.

The data store 222 may store data that is received and processed by the various components of the service plan component 202. As described above, the data store 222 may store the customer accounts 224. Additionally, the data store 222 may further store a transaction database 226 that tracks user purchases made through the network portal.

Figure 3:
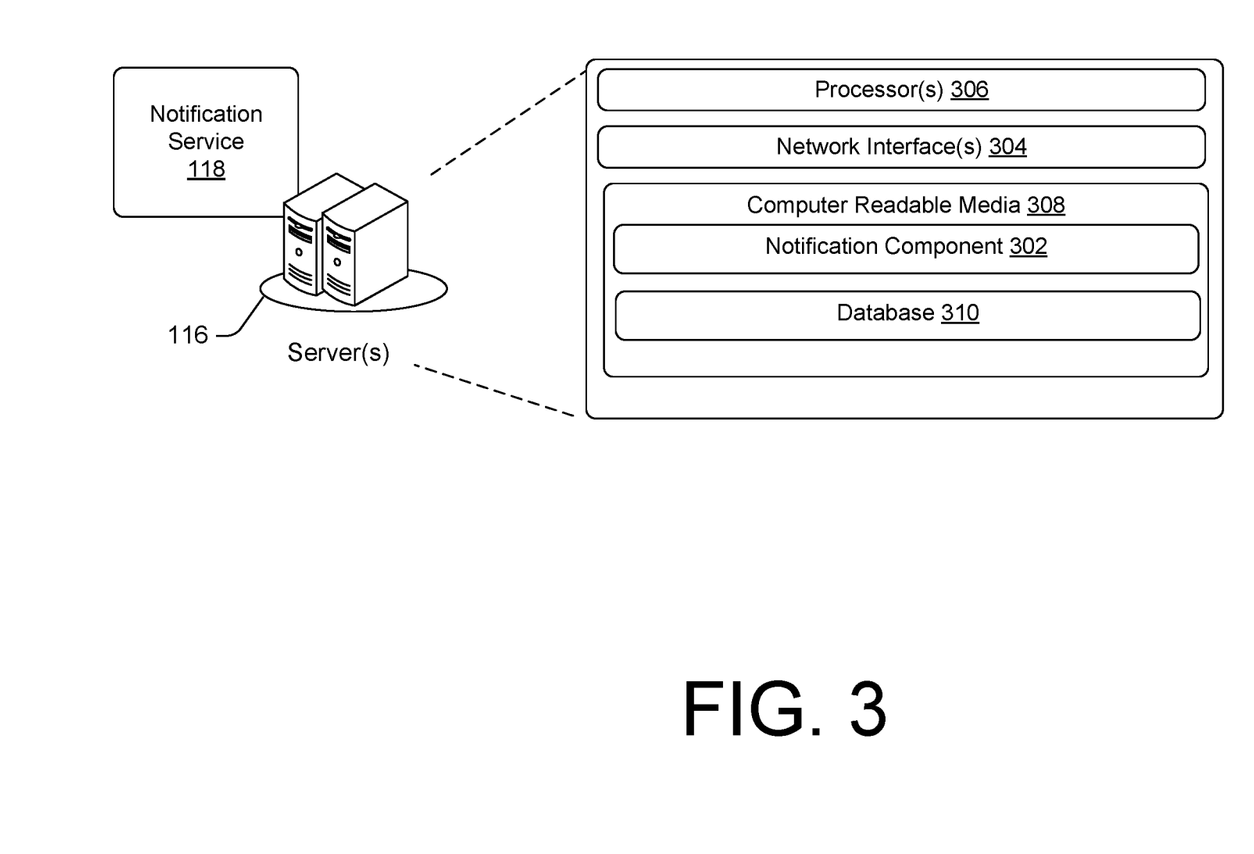
FIG. 3 is a schematic diagram of illustrative components in an example server of a notification service that configures a user device with access to a content provider.

FIG. 3 is a schematic diagram of illustrative components in an example server 116 that configures a user device with access to a content provider. A notification component 302 may be implemented by the one or more servers 116. In some cases, the servers 116 may be associated with the notification services 118. The servers 116 may be equipped with network interfaces 304, processor(s) 306, and non-transitory computer readable media 308. The network interfaces 304 may include wireless and/or wireless communication interface components that enable the servers 116 to transmit and receive data via a network. In various embodiments, the wireless interface component may include, but is not limited to, cellular, Wi-Fi, Ultra-wideband (UWB), Bluetooth, satellite transmissions, and so forth. The wired interface component may include a direct input/output (I/O) interface, such as an Ethernet interface, a serial interface, a Universal Serial Bus (USB) interface, an application programming interface (API), and/or so forth.

The computer readable media 308 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions.

The notification component 302 may be configured to communicate with a management application stored on the user device 110. The management application may provide the notification service 118 with remote management of the user device 110 and may cause the user device 110 to perform certain actions, such as, but not limited to, pushing messages, pushing notifications, deleting other applications, adding other applications, activating/deactivating Wi-Fi, updating other applications, etc.

In some cases, once the notification service 118 has received the transmission 114 indicating that a user account associated with the user 104 now has access to the content provider, the notification service 118 may access a database 310 to determine if the management application is installed on the user device 110. In some cases, the database 310 may be a remote device separate from the server 116 (such as database 122) and the server 116 may send a transmission 120 to the database 310 to determine if the user device 110 associated with the user 104 has the management application installed. For example, the notification service 118 may receive the transmission 114 from the service provider 102 via an application programming interface (API) call established between the service provider 102 and the notification service 118. The transmission 114 may include the identifiable information of the user account (e.g., username, telephone number, etc.) and may include an indication that the user account now has access to the content provider. The database 310 may contain records of each device that has the management application installed. The notification service 118 may use the identifiable information provided in the transmission 114 to search the database 310 and determine if the user device 110 has downloaded the management application. The database 310 may indicate to the notification service 118 that the user device 110 has previously downloaded the management application. In some cases, device information stored in the database 310 may be listed by Mobile Station International Subscriber Directory Number (MSISDN) and/or by Billing Account Number (BAN). Each device listed in the database 310 may include an indication whether or not the device has installed the management application.

In various embodiments, if the notification service 118 determines that the user device 110 associated with the user 104 does have the management application installed, the notification service 118 may send a message 126, such as a push notification, to the user device 110 via notification component 302 to the management application. The message 126 may include an indication to the user 104 that the new service plan and/or the upgraded service plan includes access to a content provider. In some cases, the message 126 may indicate that an application associated with the content provider has been automatically downloaded onto the user device 110. In other cases, the message 126 may provide a selectable option for the user 104 to download the application onto the user device 110. In response to the user 104 selecting to download the application, the user device 110 may automatically download the application to the user device 110.

Figure 4:
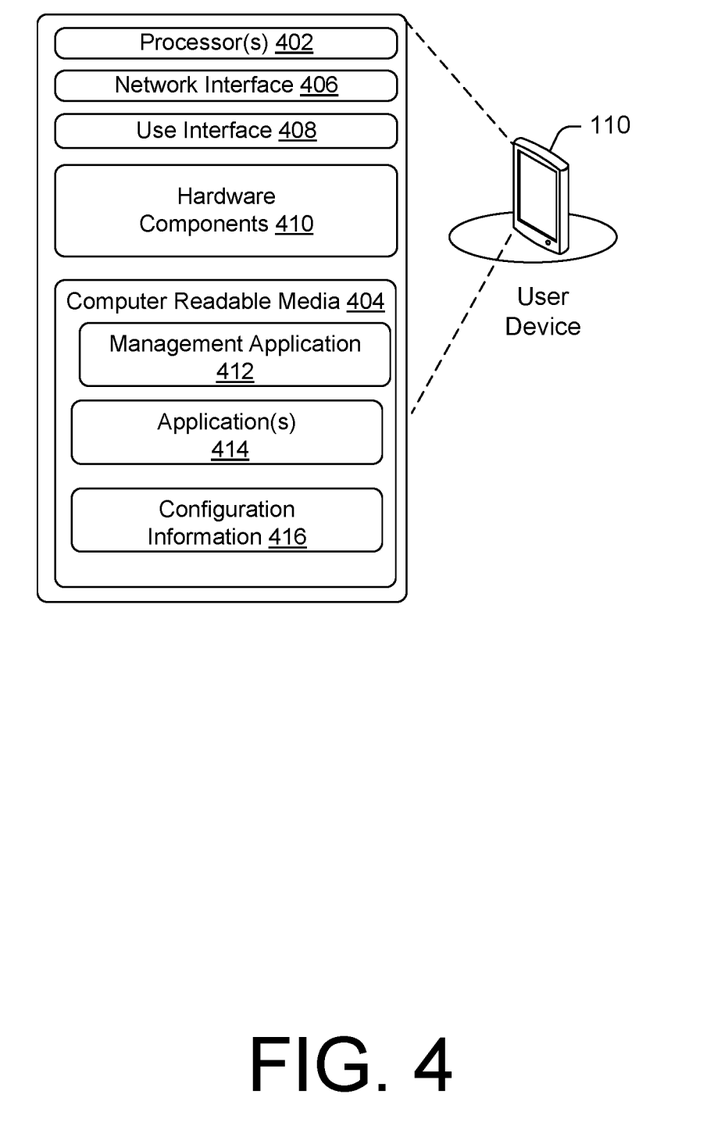
FIG. 4 is a schematic diagram of illustrative components in an example user device that is configured to access a content provider.

FIG. 4 is a schematic diagram of illustrative components in the example user device 110 that is configured to receive notifications enabling access to content providers. The user device 110 may include processor(s) 402 and computer readable media 404. The computer readable media 404 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions.

The user device 110 may also include a network interface 406, a user interface 408, and hardware component 410. The network interface 406 may include wireless and/or wired communication components that enable the user device 110 to transmit data to and receive data from other devices via the network. For example, the network interface 406 may include a cellular communication transceiver, a Wi-Fi transceiver, a wired network interface transceiver, and so forth.

The user interface 408 may enable a user to provide inputs and receive outputs from the user device 110. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The hardware component 410 may include an internal clock, a sound card, a video card, a camera, device interfaces, motion sensors, inertia sensors, proximity sensors, a compass, and/or other components that enable the user device to perform designed functions.

The computer readable media 404 may store a management application 412, applications 414, and configuration information 416. The management application 412 may be configured to communicate with the notification component 302 of the notification service 118. For example, the management application 412 may receive a message 126, such as a push notification, from the notification component 302 of the notification service 118. The message 126 may include an indication to the user 104 that the new service plan and/or the upgraded service plan includes access to a content provider. In some cases, when the management application 412 displays the message 126, the user 104 may be informed that an application, such as application 414, associated with the content provider has been automatically downloaded onto the user device 110. In other cases, the management application 412 may display a message 126 that provides a selectable option for the user 104 to download the application onto the user device 110. In response to the user 104 selecting to download the application, the user device 110 may automatically download the application to the user device 110.

The applications 414 (e.g., the applications associated with the content provider) may include an operating system. The operating system may further include one or more components that present the output, including display data using the user interface 408, store data in memory, transmit data to another electronic device, and so forth. Additionally, the operating system may include other components that perform various other functions generally associated with an operating system, such as providing an execution environment for applications that are installed on the user device 110. The applications 414 may further include other applications that perform various functions. Such applications may include a browser, applications that control the hardware components 410 of the user device 110, and so forth.

Figure 5:
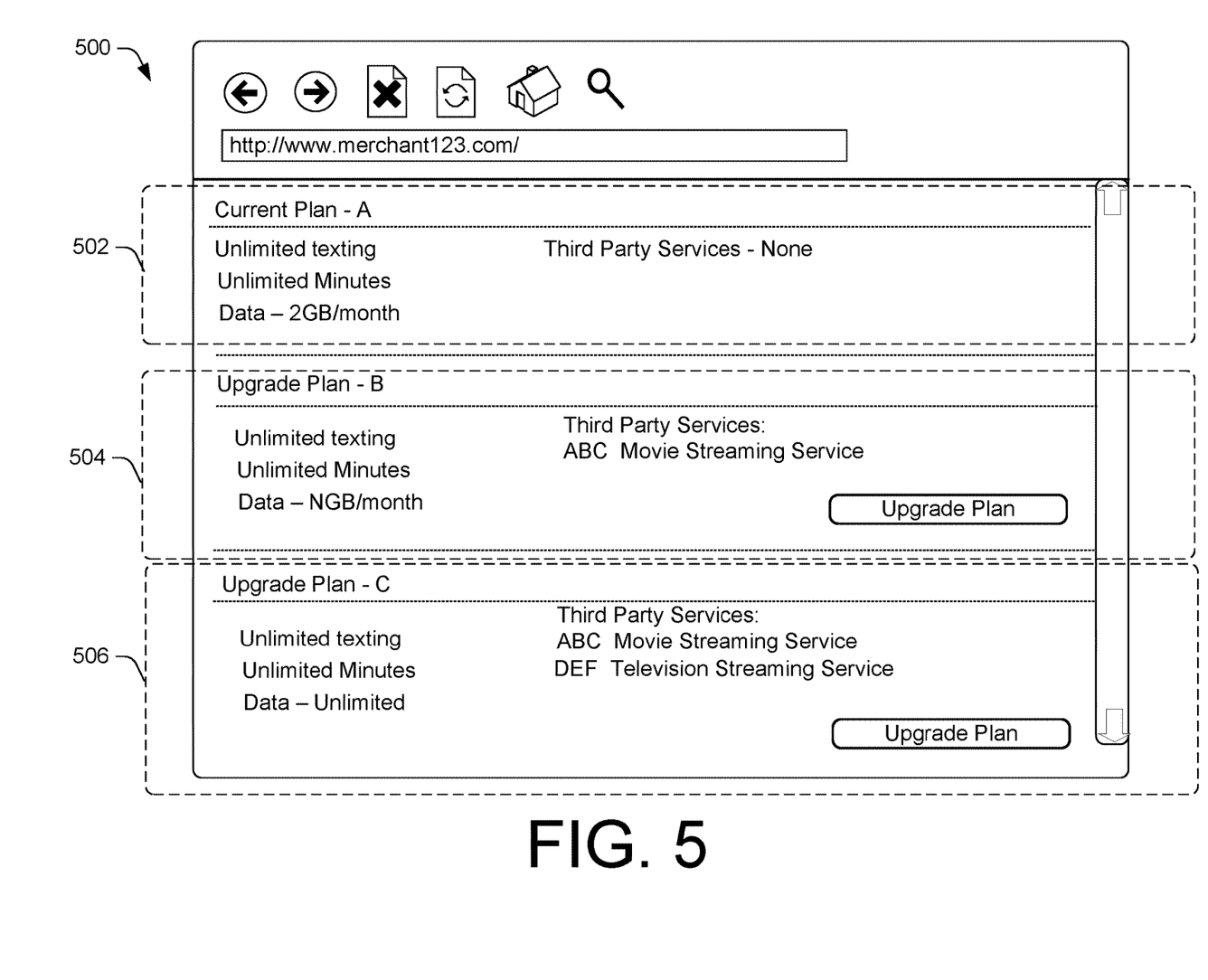
FIG. 5 shows an illustrative user interface page for providing services for use with a user device.

FIG. 5 shows an illustrative user interface page 500 for allowing a user to upgrade and/or purchase a service plan. The user interface page 500 may be a network page that is generated by the service plan component 202 for display on a computing device of a user, such as the computing device 108. The service plan component 202 may display the user interface page 500 after a user has logged onto a webpage of the service provider 102. The user interface page 500 may include a section 502, a section 504, and a section 506. The section 502 may display information regarding a current plan that the user 104 is signed up for. For example, the section 502 may display a plan name and/or type as well as the associated features of the plan, such as an amount of texting, an amount of minutes, and/or an amount of data available with the plan. Additionally, the section 502 may list any third-party services, such as content providers, that are made available to the user 104 when they are signed up with the plan. In the example shown in section 502, no third-party services are provided for "Plan A."

The section 504 may display information regarding an available upgraded "Plan B" that is available to the user 104. For example, the section 504 may display a plan name and/or type as well as the associated features of the plan, such as an amount of texting, an amount of minutes, an amount of data available with the plan, and/or any third-party services (e.g., content providers) that are associated with the plan. In the example shown in section 504, "Plan B" includes access to the "ABC Movie Streaming Service." In some cases, including access to the "ABC Movie Streaming Service" may allow the user 104 access to content provided by the "ABC Movie Streaming Service" via a user device, such as user device 110, without paying a separate fee to the "ABC Movie Streaming Service."

The section 506 may display information regarding an available upgraded "Plan C" that is available to the user 104. For example, the section 506 may display a plan name and/or type as well as the associated features of the plan, such as an amount of texting, an amount of minutes, an amount of data available with the plan, and/or any third-party services (e.g., content providers) that are associated with the plan. In the example shown in section 504, "Plan B" includes access to the "ABC Movie Streaming Service" and the "DEF Television Stream Service." As discussed herein, including access to the third-party services (e.g., content providers) via a user device, such as user device 110, may include providing access to the user device via an application, such as application 414, without paying a separate fee to the third-party service. As illustrated in FIG. 5, a selectable option "Upgrade Plan" may displayed in section 504 and section 506 for the user 104 to indicate that they would like to upgrade their plan to "Plan B" or "Plan C."

Figure 6:
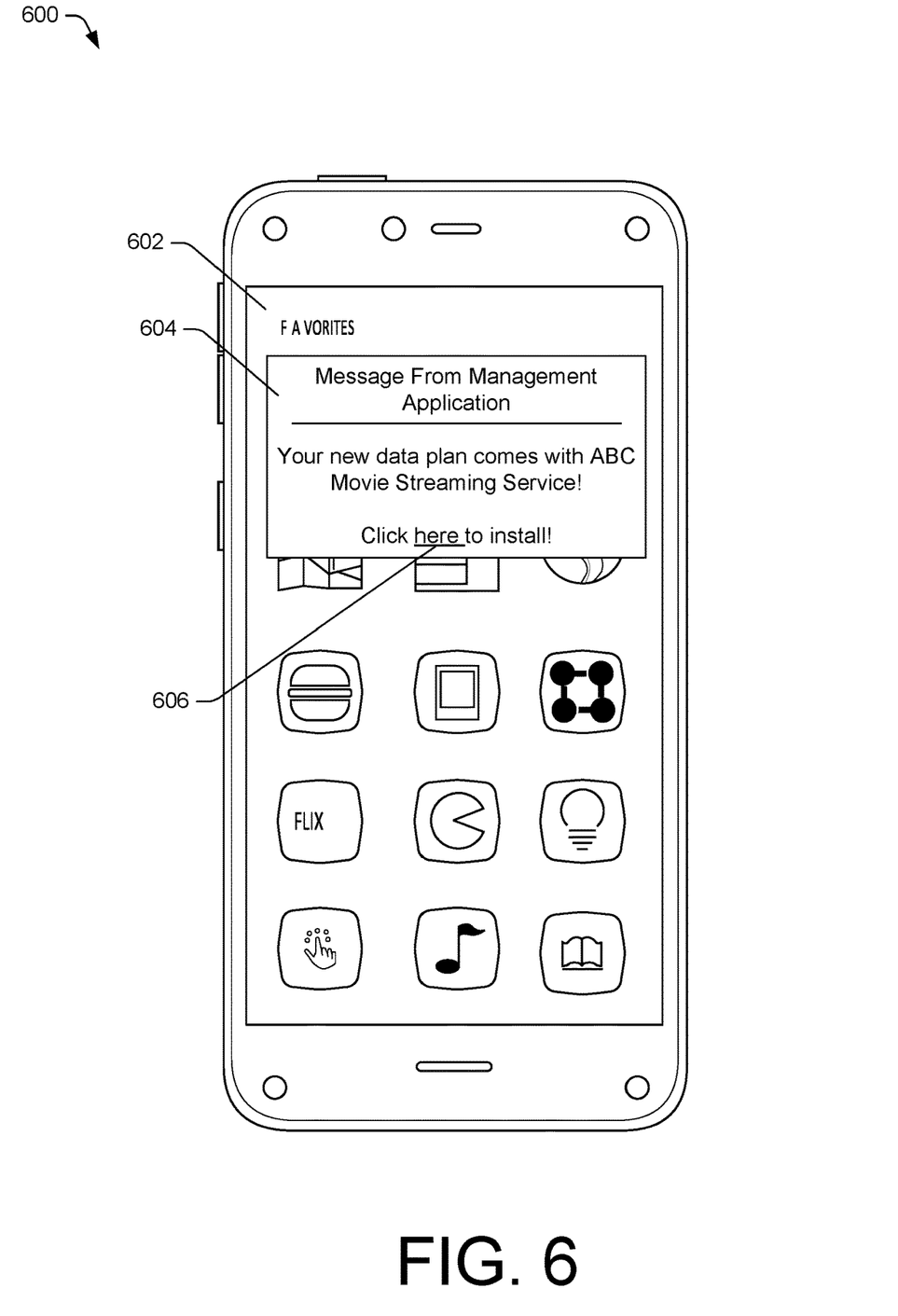
FIG. 6 shows an illustrative user interface page for receiving a notification regarding access to a content provider.

FIG. 6 shows an example user device 600, which may be the same or similar to user device 110, having an illustrative user interface page 602 for receiving a notification that an application associated with a content provider is available for download. For example, the user device 600 may store a management application, such as management application 412 that may be configured to communicate with the notification component 302 of the notification service 118. For example, the management application 412 may receive a message 604 from the notification component 302 of the notification service 118. The message 604 (which may the same or similar to message 126) may include an indication to the user 104 that the new service plan and/or the upgraded service plan includes access to a content provider. In the example of FIG. 6, when the management application 412 displays the message 604, the user 104 may be informed that an application, such as application 414, associated with the content provider is available to downloaded onto the user device 600. In this case, the management application 412 displays a selectable option 606 for the user 104 to download the application onto the user device 600. In response to the user 104 selecting to download the application, the user device 600 may automatically download the application. In some cases, once the user device 600 is instructed to download the application associated with the content provider (e.g., via instruction from the user 104 or via instruction from the notification service 118), the user device 600 may access an application repository, such as application repository 128, that may provide the user device 600 with the requested application.

Illustrative Operations

Figure 7:
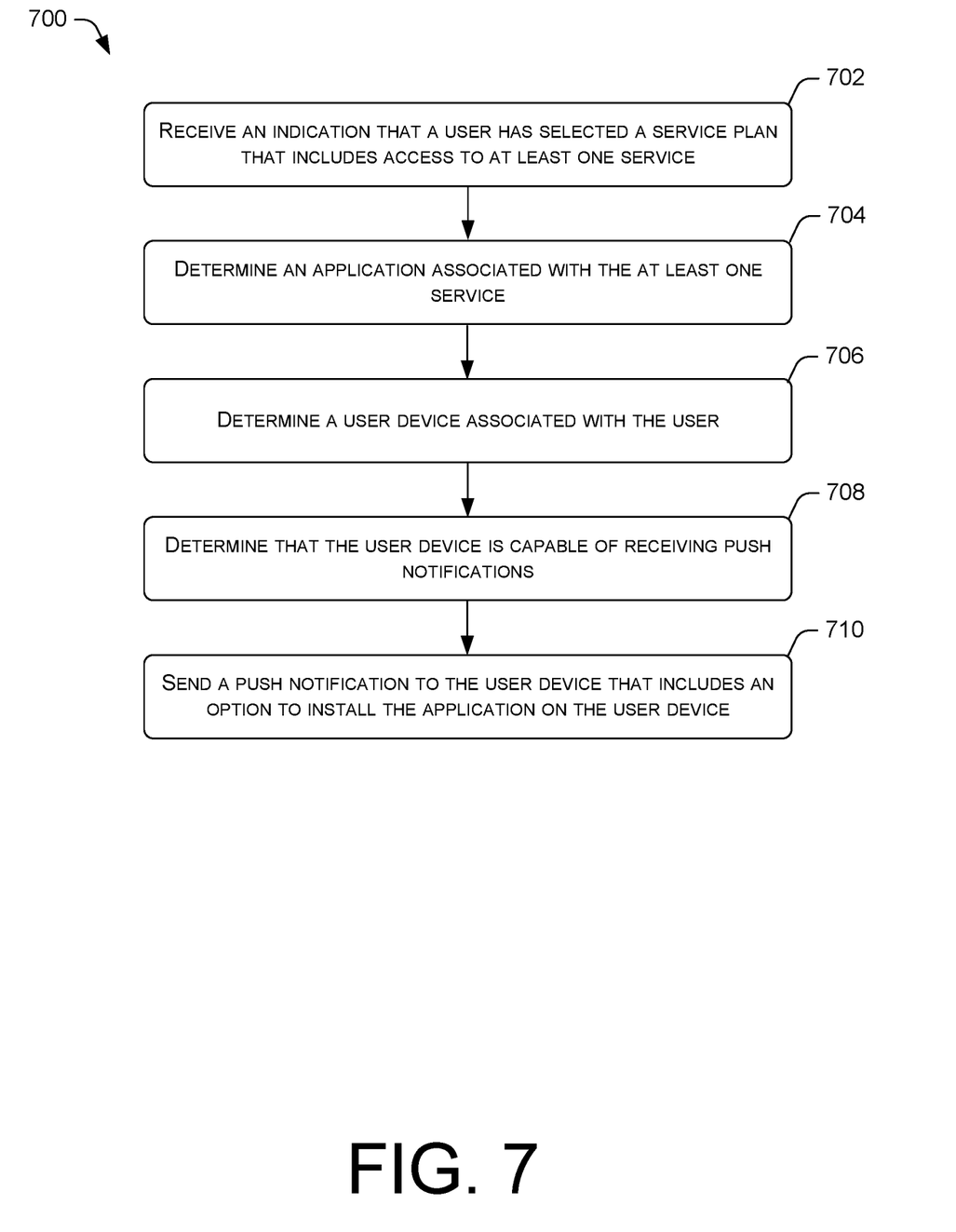
FIG. 7 is a flow diagram of an illustrative process for providing a user device a notification of access to a content provider.

FIG. 7 shows illustrative process 700 for enabling a user device with access to a content provider. The process 700 is illustrated as a collection of blocks in a logical flow diagram, which represents a sequence of operations that can be implemented in hardware software or executable in hardware. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be omitted and/or combined in any order and/or in parallel to implement the processes. For discussion purposes, the process 700 is described with reference to the computing environment 100 of FIG. 1, however other environments may also be used.

FIG. 7 is a flow diagram of an illustrative process 700 for providing a notification to user device that enables the user device to have access to a content provider.

At block 702, a computing device may an indication of a selection of a service plan that includes access to at least one content provider. For example, if a user 104 decides to sign up for a new service or upgrade an existing service for use with the user device 110 by making a selection 112, the service provider 102 may send a transmission 114 to a notification server 116 of a notification service 118 indicating that the user now has access to said content providers.

The notification service 118 may operate as a platform that communicates with a management application stored on the user device 110. The management application may provide the notification service 118 with remote management of the user device 110 and may cause the user device 110 to perform certain actions, such as, but not limited to, pushing messages, pushing notifications, deleting other applications, adding other applications, activating/deactivating Wi-Fi, updating other applications, etc.

At block 704, a computing device may determine an application associated with the at least one content provider. For example, the transmission 114 may also include an indication that an application exists that is associated with the content provider and may be usable by the user device 110 to access content provided by the content provider.

At block 706, a computing device may determine a user device associated with the selection. For example, the notification service 118 may receive the transmission 114 from the service provider 102 via an application programming interface (API) call established between the service provider 102 and the notification service 118. The transmission 114 may include the identifiable information of the user account (e.g., username, telephone number, etc.) and may include an indication that the user account now has access to the content provider. The notification service 118 may use the identifiable information provided in the transmission 114 to search the database 122 and determine if the user device 110 is listed in the database 122 and has downloaded the management application.

At block 708, a computing device may determine that the user device is capable of receiving push notifications. For example, once the notification service 118 has received the transmission 114 indicating that a user account associated with the user 104 now has access to the content provider, the notification service 118 may send a transmission 120 to a database 122 to determine if the user device 110 associated with the user 104 has the management application installed. The database 122 may return a transmission 124 indicating to the notification service 118 that the user device 110 has previously downloaded the management application. In some cases, device information stored in the database 122 may be listed by Mobile Station International Subscriber Directory Number (MSISDN) and/or by Billing Account Number (BAN). Each device listed in the database 122 may include an indication whether or not the device has stored the management application.

At block 710, a computing device may send a push notification to the user device that includes an option to install the application on the user device. For example, if the notification service 118 determines that the user device 110 associated with the user 104 does have the management application installed, the notification service 118 may send a message 126, such as a push notification, to the user device 110 via the management application. The message 126 may include an indication to the user 104 that the new service plan and/or the upgraded service plan includes access to a content provider. In some cases, the application may be automatically downloaded and installed to the user device 110 and the message 126 may indicate that an application associated with the content provider has been automatically downloaded onto the user device 110. In other cases, the message 126 may provide a selectable option for the user 104 to download the application onto the user device 110.

In summary, by determining which user accounts are allowed access to particular content providers and determining that a user device associated with the user account includes a management application, a notification service enables a user access to the content provider without the user having to self-discover the application themselves or having to provide login information to the content provider, which may dissuade the user from accessing the content provider.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a server, the method comprising:
    receiving an indication of a selection of a service plan that includes access to at least one content provider, the service plan being provided by a telecommunications provider and being associated with a data plan;
    determining an application associated with the at least one content provider;
    determining a user device associated with the selection;
    determining that the user device is authorized to access the at least one content provider based at least in part on receiving the selection of the service plan;
    determining that the user device is capable of receiving push notifications; and
    sending a push notification to the user device that includes an option to install the application on the user device based at least in part on determining that the user device is authorized to access the at least one content provider, wherein the at least one content provider comprises a third-party service and the application associated with the at least one content provider is stored in a repository associated with the server.

2. The method of claim 1, wherein the indication includes receiving an application programming interface (API) call including an instruction to send the push notification and a telephone number associated with the user device.

3. The method of claim 1, wherein determining that the user device is capable of receiving push notifications comprises accessing a database to determine that the user device has previously installed a management application associated with a notification service and sending the push notification includes sending the push notification via the management application.

4. The method of claim 3, wherein the application comprises a first application and the management application associated with the notification service comprises a second application that was previously stored on the user device.

5. The method of claim 3, wherein accessing the database comprises searching for a mobile station international subscriber directory number (MSISDN) number that is stored in the database and associated with a telephone number associated with the user device.

6. The method of claim 1, wherein the indication is a first indication associated with a first selection, the method further comprising, in response to receiving a second indication of a second selection to install the application, sending the application to the user device to be installed.

7. The method of claim 1, further comprising storing multiple applications associated with multiple content providers within the repository associated with the server.

8. A system including a server comprising:
    one or more processors; and
    non-transitory computer-readable media storing computer-executable instructions that, when executed by the one or more processors, cause the one or more processors to perform actions comprising:
        receiving an indication of a selection of a service plan that includes access to at least one content provider, the service plan being provided by a telecommunications provider and being associated with a data plan;
        determining an application associated with the at least one content provider;
        determining a user device associated with the selection;
        determining that the user device is authorized to access the at least one content provider based at least in part on receiving the selection of the service plan;
        determining that the user device is capable of receiving push notifications; and
        sending a push notification to the user device that includes an indication that the application is available to the user device based at least in part on determining that the user device is authorized to access the at least one content provider, wherein the push notification causes the user device to automatically install the application from a repository associated with the server.

9. The system of claim 8, wherein determining that the user device is capable of receiving push notifications comprises accessing a database to determine that the user device has previously installed a management application associated with a notification service and sending the push notification includes sending the push notification via the management application.

10. The system of claim 9, wherein the application comprises a first application and the management application associated with a notification service comprise a second application that was previously stored on the user device.

11. The system of claim 9, wherein accessing the database comprises searching for a mobile station international subscriber directory number (MSISDN) number that is stored in the database and associated with a telephone number associated with the user device.

12. The system of claim 8, wherein the at least one content provider comprises at least one of a movie streaming service, a television streaming service, a music streaming service, an electronic book service, or an audio book service.

13. The system of claim 8, wherein the at least one content provider comprises a third-party service and the application associated with the at least one content provider is stored in a repository associated with the server.

14. A server comprising:
one or more processors; and
non-transitory computer-readable media storing computer-executable instructions that, when executed by the one or more processors, cause the one or more processors to perform actions comprising:
receiving an indication of a selection of a service plan that includes access to at least one content provider, the service plan being provided by a telecommunications provider and being associated with a data plan;
determining an application associated with the at least one content provider;
determining a user device associated with the selection;
determining that the user device is authorized to access the at least one content provider based at least in part on receiving the selection of the service plan;
determining that the user device is capable of receiving push notifications; and
sending a push notification to the user device that includes an option to install the application on the user device based at least in part on determining that the user device is authorized to access the at least one content provider, wherein the push notification causes the user device to automatically install the application.

15. The server of claim 14, wherein the indication includes receiving an application programming interface (API) call including an instruction to send the push notification and a telephone number associated with the user device.

16. The server of claim 14, wherein determining that the user device is capable of receiving push notifications comprises accessing a database to determine that the user device has previously installed a management application associated with a notification service and sending the push notification includes sending the push notification via the management application.

17. The server of claim 16, wherein accessing the database comprises searching for a mobile station international subscriber directory number (MSISDN) number that is stored in the database and associated with a telephone number associated with the user device.

18. The server of claim 14, wherein the at least one content provider comprises a third-party service and the application associated with the at least one content provider is stored in a repository associated with the server.

19. The server of claim 14, wherein the indication is a first indication associated with a first selection, the actions further comprising, in response to receiving a second indication of a second selection to install the application, sending the application to the user device to be installed.

20. The method of claim 7, wherein each of the multiple content providers comprise a respective third-party service accessible to the user device via the multiple applications.

* * * * *